(No Model.)
W. D. & T. J. SNOWDEN.
FENCE.
No. 473,092. Patented Apr. 19, 1892.
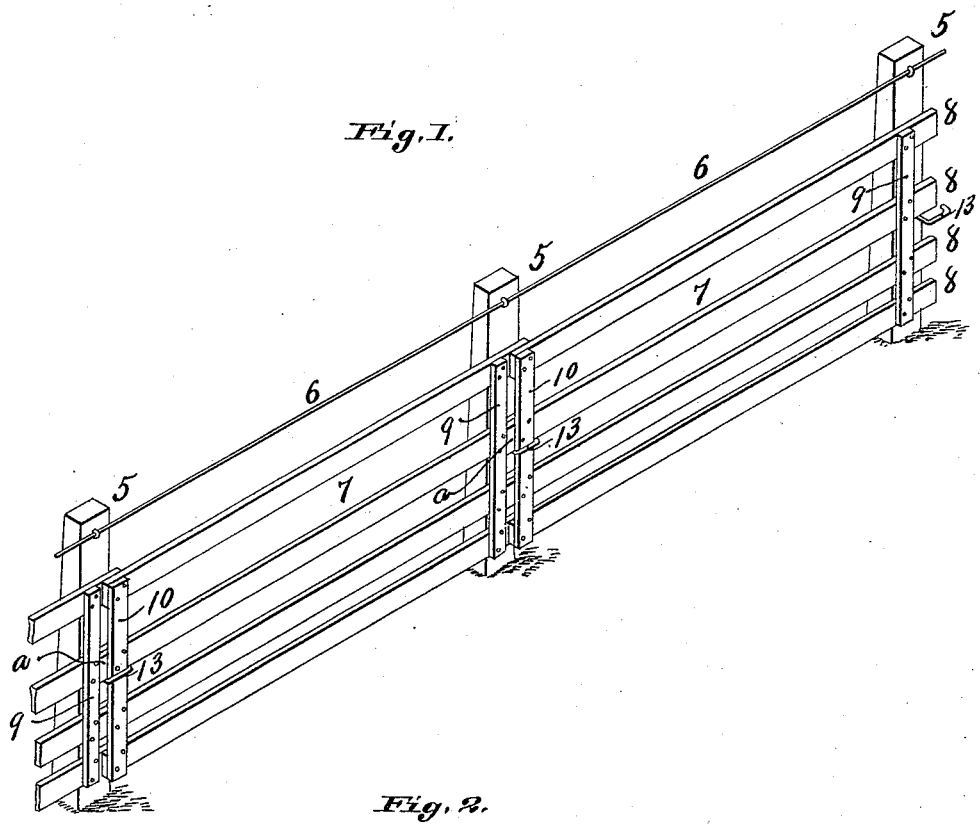
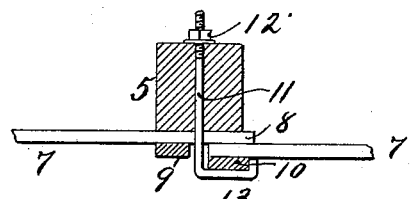
Witnesses:
Sam'l S. Fowler
M. M. Brown
Inventors
Wm. D. Snowden,
Thos. J. Snowden,
By Fowler & Fowler
Attorneys.

UNITED STATES PATENT OFFICE.

WILLIAM D. SNOWDEN AND THOMAS J. SNOWDEN, OF LERNA, ILLINOIS.

FENCE.

SPECIFICATION forming part of Letters Patent No. 473,092, dated April 19, 1892.

Application filed June 20, 1891. Serial No. 396,914. (No model.)

*To all whom it may concern:*

Be it known that we, WILLIAM D. SNOWDEN and THOMAS J. SNOWDEN, citizens of the United States, residing at Lerna, in the county of Coles and State of Illinois, have invented certain new and useful Improvements in Fences, of which the following is such a full, clear, and exact description as will enable any one skilled in the art to which it appertains to make and use the same, reference being had to the accompanying drawings, forming part of this specification.

The object of our invention is to enable a wire fence used for the larger animals—such as horses, cows, &c.—to be transformed into a fence for the smaller animals—such as hogs, sheep, and the like—and keep such latter animals within bounds with such fence.

The invention briefly and generally stated consists of one or more overlapping panels, which are adapted to be removably secured to the posts of an ordinary wire fence below the wire thereof and held thereto by suitable detachable devices, thereby preventing the smaller animals from passing under the wire of the fence and enabling a fence for the larger animals to be readily converted into a fence for smaller animals, and vice versa.

The invention will be best understood by referring to the accompanying drawings, making a part of this specification, and the letters and numerals of reference marked thereon, together with the detailed description now to be set forth.

In the said drawings, Figure 1 is an isometric projection of a fence made in accordance with our invention. Fig. 2 is a detail sectional plan showing the peculiar form of bolt by which the overlapping panels of the fence are secured to the posts.

The same marks of reference indicate the same parts in the two views.

5 are the posts supporting a wire 6 near the top thereof, which together form the ordinary wire fence now generally in use. This kind of fence is adapted to keep within bounds the larger animals—such as horses, cows, and the like—and to readily adapt it for the smaller animals at short notice—such as hogs, sheep, and the like—and to adapt the fence for one or the other kinds of animals we provide panels 7, made, preferably, of wood and of any suitable number of rails high, with ends 8 projecting beyond the cross-piece 9, which secures the rails together at that end, the cross-piece which secures the other ends of the rails together coming about flush with the ends of the rails, except that the rail of the overlapping section above the bolt to be described at the latter end of the panel projects slightly beyond the cross-piece 10 at *a*, in order that that end of the overlapping section may preferably rest upon and be supported by the said bolt. The panels are designed to overlap one another at the posts in the manner indicated in the drawings. The projecting ends 8 of the overlapped panel extend a little beyond the posts, the inside edge of the cross-piece 9 of such panel coming about even with the vertical edges of the post, so that the end of another panel with non-projecting edges may be placed over the first-mentioned panel and made to overlap the same, the inside edge of the cross-piece 10 of such other panel coming about even with the other upright face of the post.

To join the panels to the posts, we provide a bolt 11, having a suitable nut 12 upon the screw-threaded end thereof and a right-angled extension 13, which takes over the cross-piece 10 of the overlapping panel and locks the two panels firmly to the posts, the shank of the bolt and the cross-pieces 9 and 10 preventing the panel from being shifted longitudinally in one or the other direction. This bolt passes through a hole made in the post, but preferably does not pass through the wood of the panels, it by preference going beneath the projecting ends of one of the middle rails of both of the interlocking panels, so that the panels rest upon and are supported above the ground by the said bolt, if preferred. The panels may be made of any suitable length and should be as portable as possible.

By means of this invention pasture or meadow land may be transformed into an inclosure or pen for small animals. The wire only of such a fence will keep the larger animals within bounds and the panels the smaller animals. Such a fence is very portable, in that the panels may be removed from the posts, the wire detached and rolled up, and then the posts themselves taken up and transported, and the fence set up again at any desired place.

The fence can be made all of boards or rails without using wire, if preferred.

Having now fully set forth our invention, what we desire to claim and secure by Letters Patent of the United States is—

The combination, to form a fence, of the posts 5, a wire or rail 6, passing along the top thereof, removable panels 7, applied to such posts below the wire or rail, with ends 8 of the rails of such panels projecting beyond the cross-piece 9, the cross-piece 10 at the other end thereof about flush with the ends of the rails, but having one rail at said end slightly protruding, and a right-angled bolt 11, passing through the posts, upon which said panels rest and are supported and gripping the cross-piece of the overlapping panel, substantially as and for the purpose described.

In testimony whereof we have hereunto set our hands and affixed our seals, this 15th day of June, 1891, in the presence of the two subscribing witnesses.

WILLIAM D. SNOWDEN. [L. S.]
THOMAS J. SNOWDEN. [L. S.]

Witnesses:
C. E. WILSON,
G. S. RICHMOND.